United States Patent
Yu et al.

(10) Patent No.: US 9,532,322 B2
(45) Date of Patent: Dec. 27, 2016

(54) MOBILE TERMINAL AND METHOD FOR CONTROLLING THE SAME IN CONSIDERATION OF COMMUNICATION ENVIRONMENT

(71) Applicant: Samsung Electronics Co., Ltd., Suwon-si, Gyeonggi-do (KR)

(72) Inventors: Yong Jun Yu, Yongin-si (KR); Il Seob Baek, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/593,487

(22) Filed: Jan. 9, 2015

(65) Prior Publication Data

US 2015/0119100 A1 Apr. 30, 2015

Related U.S. Application Data

(63) Continuation of application No. 13/370,937, filed on Feb. 10, 2012, now Pat. No. 8,977,318.

(30) Foreign Application Priority Data

Feb. 10, 2011 (KR) .................. 10-2011-0011983
Feb. 9, 2012 (KR) .................. 10-2012-0013294

(51) Int. Cl.
*H04M 13/00* (2006.01)
*H04W 52/38* (2009.01)
*H04M 1/00* (2006.01)
*H04W 52/28* (2009.01)

(52) U.S. Cl.
CPC ............ *H04W 52/38* (2013.01); *H04M 1/00* (2013.01); *H04W 52/288* (2013.01); *H04M 2250/12* (2013.01)

(58) Field of Classification Search
CPC ..................................... H04M 13/00
USPC ............ 455/117, 575.7, 129, 522; 379/185
See application file for complete search history.

(56) References Cited

U.S. PATENT DOCUMENTS

| 6,934,515 B2* | 8/2005 | Wallach | H04B 1/3838 455/226.1 |
| 7,146,139 B2* | 12/2006 | Nevermann | H04B 1/3838 343/702 |
| 7,499,722 B2* | 3/2009 | McDowell | H04B 1/3838 455/115.1 |
| 7,659,855 B2 | 2/2010 | Mashima et al. | |

(Continued)

FOREIGN PATENT DOCUMENTS

| CN | 101496222 A | 7/2009 |
| JP | 11-308142 A | 11/1999 |

(Continued)

*Primary Examiner* — Olisa Anwah
(74) *Attorney, Agent, or Firm* — Jefferson IP Law, LLP (57) ABSTRACT

A mobile terminal and a method for controlling the same in consideration of communication environment are provided. The mobile terminal includes a grip sensor unit for generating sensing signals corresponding to user grip, a control unit for identifying a grip pattern on the basis of sensing signals from the grip sensor unit, for extracting communication control information associated with the identified grip pattern, and for performing at least one of power control and antenna tuning control; and a communication means to which power control and antenna tuning are applied under control of the control unit.

23 Claims, 5 Drawing Sheets

(56) References Cited

U.S. PATENT DOCUMENTS

| | | |
|---|---|---|
| 2004/0152497 A1 | 8/2004 | Odachi et al. |
| 2004/0207542 A1 | 10/2004 | Chang et al. |
| 2005/0096081 A1 | 5/2005 | Black et al. |
| 2005/0124305 A1* | 6/2005 | Stichelbout .......... H04B 1/3838 455/117 |
| 2006/0154687 A1 | 7/2006 | McDowell et al. |
| 2008/0039043 A1 | 2/2008 | Yamazaki et al. |
| 2008/0086240 A1 | 4/2008 | Breed |
| 2009/0047998 A1 | 2/2009 | Alberth, Jr. |
| 2009/0143106 A1 | 6/2009 | Meitzler et al. |
| 2011/0053636 A1* | 3/2011 | Park .................... H04M 1/6041 455/550.1 |
| 2011/0159920 A1* | 6/2011 | Lehmann ............ H04M 1/0202 455/556.1 |
| 2012/0021800 A1* | 1/2012 | Wilson ................ H04W 52/146 455/550.1 |
| 2012/0056795 A1 | 3/2012 | Nagumo et al. |
| 2012/0190398 A1* | 7/2012 | Leukkunen .......... H04B 7/0691 455/522 |
| 2013/0154894 A1 | 6/2013 | Caimi et al. |
| 2015/0237183 A1* | 8/2015 | Novet ............... H04M 1/72569 455/556.1 |

FOREIGN PATENT DOCUMENTS

| | | |
|---|---|---|
| JP | 2000-286924 A | 10/2000 |
| JP | 2004-302734 A | 10/2004 |
| JP | 2005-286741 A | 10/2005 |
| KR | 10-2006-0121063 A | 11/2006 |
| KR | 10-2007-0053932 A | 5/2007 |
| KR | 10-2007-0082308 A | 8/2007 |
| KR | 10-2007-0114611 A | 12/2007 |
| RU | 2 377 626 C2 | 12/2009 |
| WO | 2010/113353 A1 | 10/2010 |

* cited by examiner

MOBILE TERMINAL AND METHOD FOR CONTROLLING THE SAME IN CONSIDERATION OF COMMUNICATION ENVIRONMENT

PRIORITY

This application is a continuation application of a prior application Ser. No. 13/370,937, filed on Feb. 10, 2012, which claimed the benefit under 35 U.S.C. §119(a) of Korean patent applications filed on Feb. 10, 2011 and Feb. 9, 2012 in the Korean Intellectual Property Office and assigned Serial Nos. 10-2011-0011983 and 10-2012-0013294, respectively, the entire disclosures of which are hereby incorporated by reference.

BACKGROUND OF THE INVENTION

1. Field of the Invention

The present invention relates to control of a mobile terminal in consideration of a communication environment. More particularly, the present invention relates to a mobile terminal and a control method for the same that can ensure a suitable level of communication performance while decreasing a Specific Absorption Rate (SAR) according to the communication environment.

2. Description of the Related Art

In recent years, mobile terminals, which can provide various user functions related to mobile communication, gaming, and scheduling, while supporting mobility, have been widely popularized. Mobile terminals should be miniaturized to support mobility, have various design features to meet diverse user requirements, and contain many components to provide various functions. Hence, mobile terminals should be designed to make maximum use of a limited space.

In particular, an antenna of a mobile terminal cannot be miniaturized without limit and still ensure an appropriate level of communication performance, and should have a ground structure suitable for layout arrangement. To conform to international regulations on SAR, mobile terminals cannot increase the transmit power without limit to boost communication performance SAR is a measure of the rate at which energy is absorbed by the human body when exposed to a Radio Frequency (RF) electromagnetic field generated by a mobile terminal, and is defined as the power absorbed per mass of tissue in watts per kilogram (W/kg). Many governments set SAR safety limits to protect people from RF electromagnetic energy. For example, South Korea, USA, Australia, and Canada have an SAR safety limit of 1.6 W/kg (averaged over 1 gram of tissue), and Japan and Europe have an SAR safety limit of 2 W/kg (averaged over 10 grams of tissue). Accordingly, it is necessary to develop a new technique that ensures a suitable level of communication performance while conforming to SAR regulations.

SUMMARY OF THE INVENTION

Aspects of the present invention are to address at least the above-mentioned problems and and/or disadvantages and to provide at least the advantages described below. Accordingly, an aspect of the present invention is to provide a mobile terminal and a method for controlling the same that perform power control for a Specific Absorption Rate (SAR) reduction in consideration of grip conditions.

Another aspect of the present invention is to provide a mobile terminal and a method for controlling the same that ensure a suitable level of communication performance while reducing an SAR according to a grip type of the user.

In accordance with an aspect of the present invention, a method for controlling a mobile terminal according to a communication environment is provided. The method includes generating sensing signals corresponding to a user's grip, identifying a grip pattern on a basis of the sensing signals, determining control information for a communication means associated with the identified grip pattern, and performing at least one of power control and antenna tuning control with respect to the communication means.

In accordance with another aspect of the present invention, a mobile terminal controllable according to a communication environment is provided. The terminal includes a grip sensor unit for generating sensing signals corresponding to a user's grip, a control unit for identifying a grip pattern on a basis of the sensing signals from the grip sensor unit, for determining communication control information associated with the identified grip pattern, and for performing at least one of power control and antenna tuning control, and communication means to which the power control and the antenna tuning are applied under control of the control unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
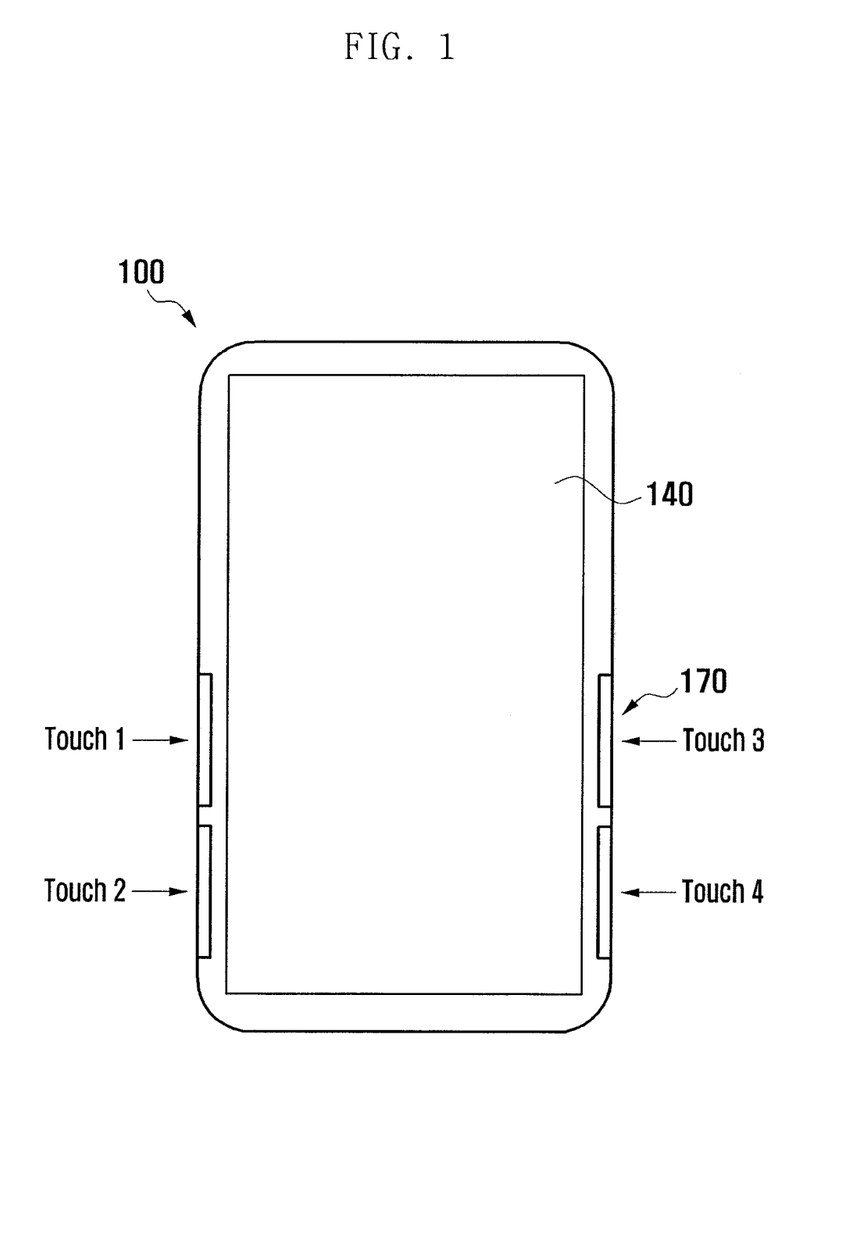
FIG. 1 is an exterior view of a mobile terminal according to an exemplary embodiment of the present invention.
Figure 2:
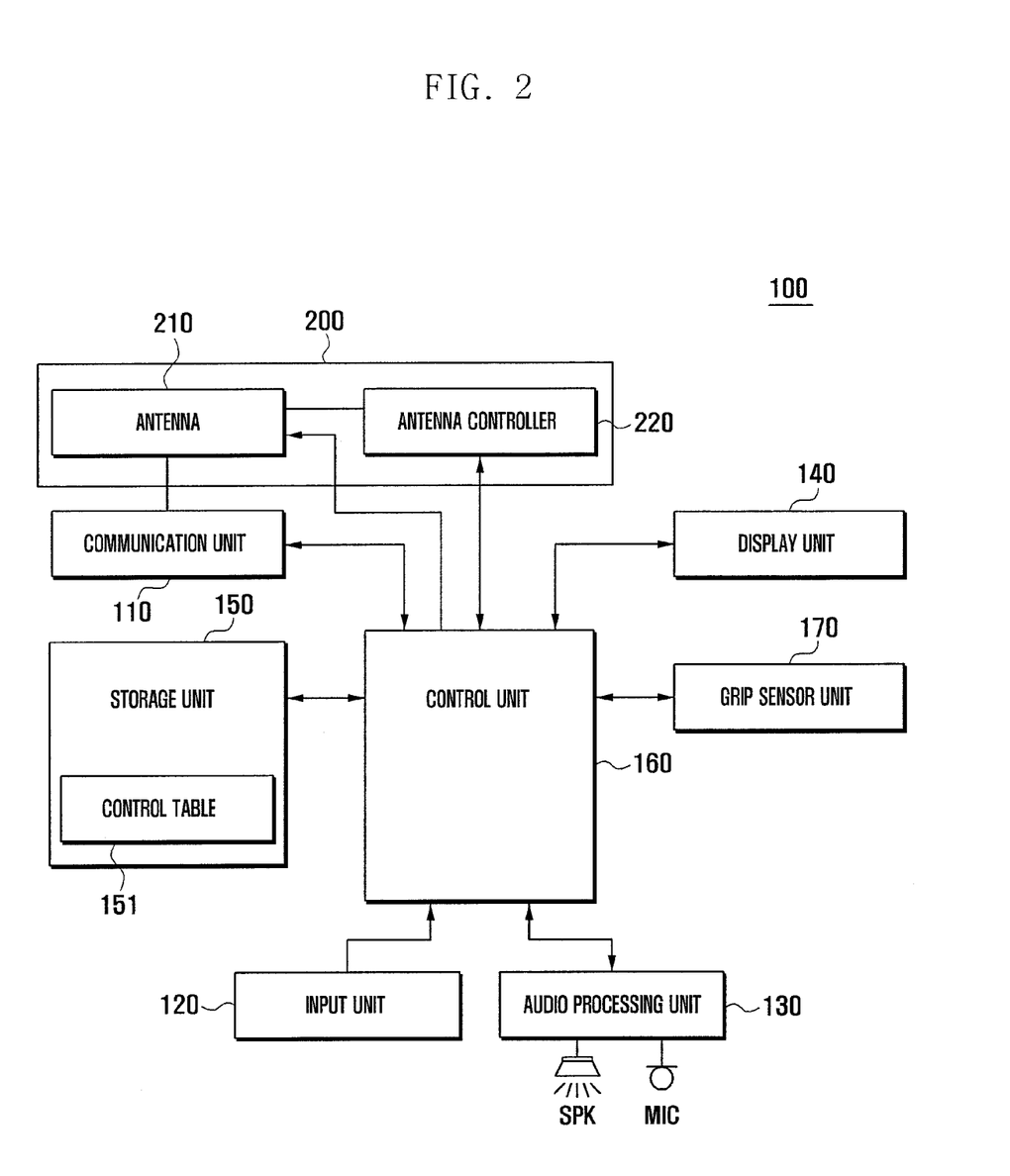
FIG. 2 is a block diagram of the mobile terminal of FIG. 1 according to an exemplary embodiment of the present invention.

FIG. 1 is an exterior view of a mobile terminal 100 according to an exemplary embodiment of the present invention. FIG. 2 is a block diagram of the mobile terminal 100 of FIG. 1 according to an exemplary embodiment of the present invention.

Referring to FIGS. 1 and 2, the mobile terminal 100 includes a communication unit 110, an input unit 120, an audio processing unit 130, a display unit 140, a storage unit 150, a control unit 160, a grip sensor unit 170, and an antenna module 200. Here, the communication unit 110 and the antenna module 200 together act as a communication means supporting communication functions of the mobile terminal 100.

The mobile terminal 100 having the above configuration adjusts the amount of power supplied to the antenna module 200 according to a sensed grip pattern indicated by a sensing signal from the grip sensor unit 170. That is, the mobile terminal 100 adjusts the magnitude of transmit power output of the antenna module 200 Thus, the mobile terminal 100 may adaptively decrease power for Specific Absorption Rate (SAR) reduction according to conditions of the user utilizing the mobile terminal 100. In addition, the mobile terminal 100 may perform tuning of the antenna module 200 (i.e., frequency band adjustment) according to a sensed grip pattern, thus achieving a higher level of communication performance with the same antenna configuration. The mobile terminal 100 of the present invention may perform both power reduction for SAR reduction and frequency response adjustment of the antenna module 200. Next, a description is given of individual components of the mobile terminal 100 supporting SAR reduction and antenna performance enhancement.

The communication unit 110 sends and receives signals for voice and data communication under the control of the control unit 160. To achieve this, the communication unit 110 may include a Radio Frequency (RF) transmitter for upconverting the frequency of a signal to be transmitted and amplifying the signal, and an RF receiver for low-noise amplifying a received signal and downconverting the frequency of the received signal. In particular, the amount of power supplied to the communication unit 110 may be varied according to the grip pattern sensed by the grip sensor unit 170. For example, when the grip pattern sensed by the grip sensor unit 170 is related to call handling of the communication unit 110, power fed to the communication unit 110 and transmit power output of the communication unit 110 may be decreased. This is to prevent SAR increment caused by signal transmission to the antenna module 200 through the communication unit 110 during a call. When the grip pattern is changed during or after communication at reduced power, power supplied to the communication unit 110 may be increased again. In most cases, when the user of the mobile terminal 100 is engaged in a call, the user grips sides of the mobile terminal 100 with one hand and holds the mobile terminal 100 to an ear beside the face. Hence, when the sensed grip pattern indicates a grip with one hand during a call, power supply to the communication unit 110 and transmit power output thereof may be decreased for SAR reduction. When the grip pattern is changed according to call termination, power supply to the communication unit 110 and transmit power output thereof may be increased or recovered to the initial state. In the case of using a message composition function for communication, the user takes a specific form of a grip on the mobile terminal 100. Hence, when the sensed grip pattern changes between preset grip patterns, the amount of power fed to the communication unit 110 may be changed accordingly for SAR reduction.

The input unit 120 generates various input signals necessary for controlling the mobile terminal 100. The input unit 120 includes a plurality of alphanumeric and function keys for inputting alphanumeric information and for setting various functions. The function keys may include direction, side, and shortcut keys associated with specific functions. When the mobile terminal 100 is a full-touch type terminal, the input unit 120 may include only side keys, and other alphanumeric keys may be implemented using key maps presented on the display unit 140. In particular, the input unit 120 may generate an input signal to configure grip pattern settings according to user control. For example, in response to a user request, the input unit 120 may generate an input signal for configuring different grip pattern settings for a right-handed or left-handed user. A right-handed user and a left-handed user may grip a mobile terminal in different manners when using functions related to voice calls, video calls, and data transmission. The mobile terminal 100 may provide a user interface feature for setting grip patterns for a voice call, a video call, and data transmission, and control grip pattern settings according to an input signal from the input unit 120.

The audio processing unit 130 includes a speaker SPK for outputting audio data during a call, and a microphone MIC for collecting an audio signal such as a voice signal during a call. In particular, the audio processing unit 130 may output alert sounds or announcements for SAR reduction. For example, the audio processing unit 130 may output sound effects to notify of a power reduction when the supply of power is reduced according to sensing of a grip pattern for a call. The audio processing unit 130 may also output sound effects to notify a power state recovery when the supply of power or transmit power output is recovered to the original state in response to a change in the sensed grip pattern. Output of such alert sounds or announcements may be skipped according to user settings or terminal design.

The display unit 140 displays a screen associated with an activated function of the mobile terminal 100, and generates touch events under control of the control unit 160. The display unit 140 may output a boot screen, idle screen, menu screen, and call handling screen. The display unit 140 may be realized using thin film display technology based on Liquid Crystal Display (LCD) devices or Organic Light Emitting Diodes (OLED). When LCD technology is applied, the display unit 140 may include an LCD panel, an LCD controller for controlling LCD devices, and a video memory for storing video data. In particular, the display unit 140 may output a User Interface (UI) screen for setting grip patterns and output information on sensed grip patterns. For example, the display unit 140 may output information on grip forms such as a grip on the mobile terminal 100 with the left hand, a grip on the mobile terminal 100 with the right hand, and a grip on the mobile terminal 100 with both hands on the basis of sensing signals from the grip sensor unit 170. The display unit 140 may output the contents of a control table 151 containing grip pattern descriptions in response to a user request. The control table 151 is stored in the storage unit 150. The user may identify a grip pattern and a related power reduction condition for SAR reduction with reference to the control table 151. In addition, the mobile terminal 100 may set tuning values for the antenna module 200 corresponding to sensed grip patterns. These tuning values may be further stored in the control table 151. Hence, with reference to the control table 151, the display unit 140 may output information regarding relationships between tuning values for the antenna module 200, power reduction conditions for SAR reduction, and sensed grip patterns.

The storage unit 150 stores application programs realizing functions of the present invention, application programs supporting touch actions, and application programs supporting operation of the grip sensor unit 170. The storage unit 150 may include (not shown) a program region and a data region.

The program region may store an Operating System (OS) for booting and operating the mobile terminal 100, an application program for operating the grip sensor unit 170, and application programs for optional functions of the mobile terminal 100 related to playback of sounds and viewing of still images and moving images. In particular, the program region may store a communication environment control program, which is loaded on the control unit 160 upon turning on the mobile terminal 100. The communication environment control program may include a routine for identifying the current grip pattern on the basis of sensing signals from the grip sensor unit 170, a routine for finding a power reduction value and antenna tuning value corresponding to the current grip pattern in the control table 151 stored in the storage unit 150, a routine for decreasing the supply of power to the communication unit 110 and antenna module 200 or decreasing transmit power output of the antenna module 200 according to the found power reduction value, and a routine for tuning the antenna module 200 according to the found tuning value.

The data region is an area that stores data generated in the course of using the mobile terminal 100, and may store various user data for optional functions such as moving image data, phonebook data, audio data, and content. In particular, the data region may store the control table 151 to support SAR reduction and antenna performance enhancement according to communication conditions. As described above, the control table 151 may contain power control information to decrease the supply of power to at least one of the communication unit 110 and the antenna module 200 according to a reference grip pattern for SAR reduction, and tuning information to tune the antenna module 200 according to at least one of the reference grip pattern and power reduction information for antenna performance enhancement. When the communication environment control program is loaded in the control unit 160, it may refer to the control table 151 to control power regulation and antenna tuning operations. The information regarding reference grip patterns may be adjusted or changed through a UI screen. The grip pattern UI screen may output guide notifications such as "grip with right hand," "grip with left hand," and "grip with both hands," and the user may create, adjust, or change a reference grip pattern by gripping the mobile terminal 100 for a preset time as indicated by a guide notification. The user may also set or change a right or left handedness indicator.

The grip sensor unit 170 includes one or more grip sensors installed at sides of a case structure, generates sensing signals corresponding to how the user grips the mobile terminal 100, and sends the sensing signals to the control unit 160. As shown in FIG. 1, multiple grip sensors may be installed at, for example, lower left and right sides of the mobile terminal 100 to sense contact with the fingers of the user gripping the mobile terminal 100. At least one grip sensor may be further installed at the back side (the opposite of the display unit 140) of the mobile terminal 100. At least one grip sensor may be further installed in at least one portion of the front side of the mobile terminal 100. The grip sensor unit 170 including multiple grip sensors generates different sensing signals for different forms of user grip and sends the generated sensing signals to the control unit 160, which may then identify the current grip pattern.

The antenna module 200 is connected with the communication unit 110, and may include an antenna 210 to radiate a signal from the communication unit 110 and to receive a signal and forward the received signal to the communication unit 110, and an antenna controller 220 to control tuning of the antenna 210. The antenna 210 may be implemented using a P-type or F-type antenna pattern and may be installed within the case of the mobile terminal 100. The antenna controller 220 may include various circuit elements connected to the antenna 210 to tune frequency bands of the antenna 210. For example, the antenna controller 220 may include one or more variable resistors, variable inductors, and variable capacitors connected to the antenna 210. According to antenna tuning information from the control unit 160, the antenna controller 220 may adjust variable characteristics of the corresponding circuit elements to thereby regulate frequency bands of the antenna 210. Hence, the antenna module 200 supports tunable antenna characteristics. In particular, the antenna module 200 controls tuning of a frequency response according to antenna tuning information based on sensed grip patterns, thus preventing antenna performance degradation due to the user's grip. Power supplied to the antenna 210 may be deceased according to a sensed grip pattern. Here, the antenna 210 may include an antenna pattern and an amplifier connected to the antenna pattern, and power supplied to the amplifier may be decreased for SAR reduction. In the case where the antenna 210 includes only an antenna pattern and the communication unit 110 includes an amplifier connected to the antenna pattern, a modulator, and a filter, the power supplied to the communication unit 110 may be decreased for SAR reduction. Hence, it is understandable that power control for SAR reduction is achieved through adjusting the supply of power to circuit elements in the communication means provided by the mobile terminal 100.

The control unit 160 controls the supply of power to and activation of individual components of the mobile terminal 100, and controls signal exchange between the components. In particular, the control unit 160 performs various signal control operations in relation to power control for SAR reduction and tuning control for antenna performance enhancement. For control operations, an Inter-Integrated Circuit (I2C) interface may be provided between the control unit 160 and the antenna module 200. Other communication interfaces may also be employed according to selection of the system designer. The control unit 160 may be configured as shown in FIG. 3.

Figure 3:
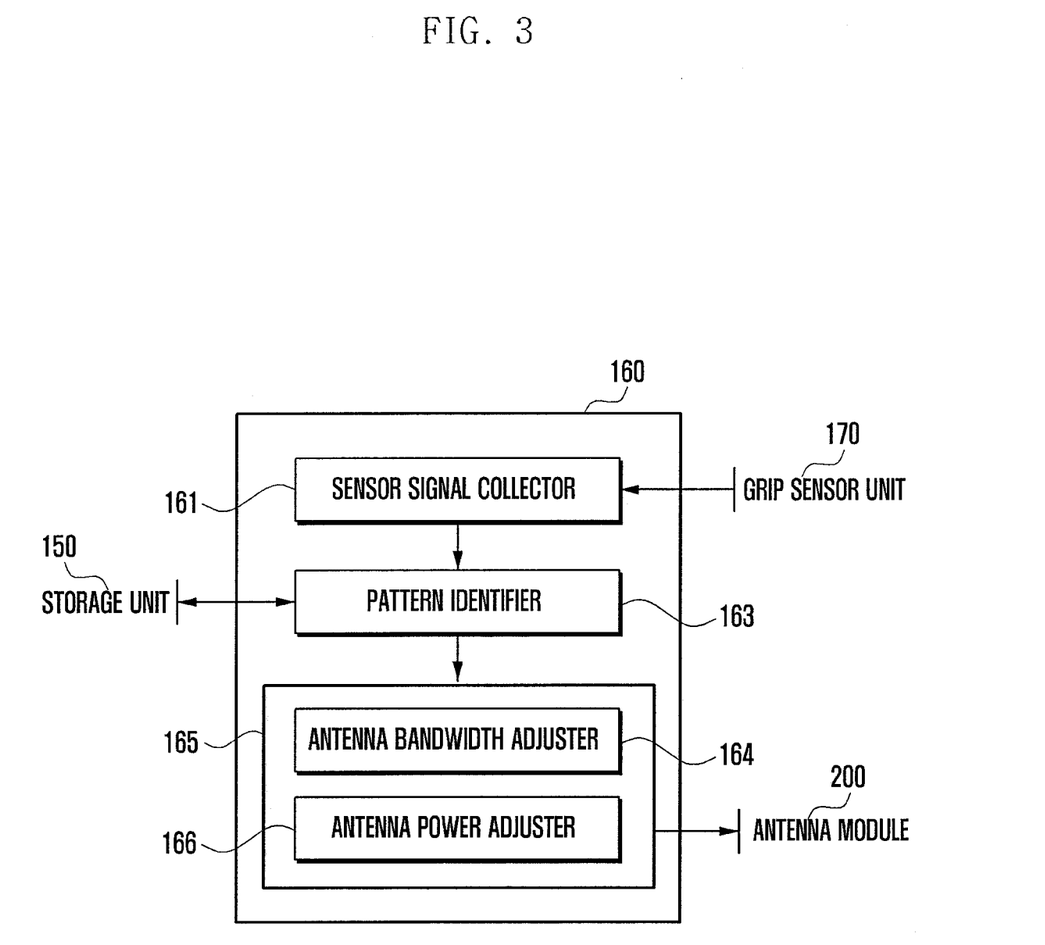
FIG. 3 is a detailed block diagram of a control unit in the mobile terminal of FIGS. 1-2 according to an exemplary embodiment of the present invention.

FIG. 3 is a detailed block diagram of the control unit 160 in the mobile terminal 100 according to an exemplary embodiment of the present invention.

Referring to FIG. 3, the control unit 160 may include a sensor signal collector 161, a pattern identifier 163, and an antenna control part 165. The antenna control part 165 may include an antenna bandwidth adjuster 164 and an antenna power adjuster 166.

The sensor signal collector 161 collects sensing signals reflecting grip states from the grip sensor unit 170. The sensor signal collector 161 monitors individual grip sensors of the grip sensor unit 170 so as to identify a grip sensor that has generated a given sensing signal. When a grip sensor generates a sensing signal, the sensor signal collector 161 sends location information of the grip sensor and a sensed signal value to the pattern identifier 163. For example, assume that multiple grip sensors of the grip sensor unit 170 are installed at sides of the case. The sensor signal collector 161 may assign location indicators to the individual grip sensors. Later, when a grip sensor generates a sensing signal, the sensor signal collector 161 may send the location indicator of the grip sensor and a sensed signal value to the pattern identifier 163.

The pattern identifier 163 forms a new grip pattern using sensed signal values and location indicators received from the sensor signal collector 161. The pattern identifier 163 compares the new grip pattern with reference to grip patterns pre-stored in the control table 151 to find a matching reference grip pattern. Here, a matching reference grip pattern may be found using a similarity measure with a given error margin. Alternatively, among the stored reference grip patterns, a reference grip pattern that is most similar to the new grip pattern may be found as a matching reference grip pattern. After finding a reference grip pattern, the pattern identifier 163 indentifies antenna tuning information and power control information associated with the found reference grip pattern and forwards the antenna tuning information and power control information to the antenna control part 165.

The pattern identifier 163 may employ a timer to derive a grip pattern using sensing signals from the grip sensor unit 170. That is, as the user tends to frequently change the form of his grip in the course of using the mobile terminal 100, real time matching for a reference grip pattern may result in waste of power and unnecessary computation. Hence, the pattern identifier 163 may activate a timer when a grip sensor signal is generated. When a newly formed grip pattern does not change for a preset time, the pattern identifier 163 may then find a reference grip pattern matching the grip pattern and forward control information for the communication means associated with the found reference grip pattern to the antenna control part 165. To achieve this, the control unit 160 may include a timer for grip pattern identification.

The antenna control part 165 receives antenna tuning information and power control information from the pattern identifier 163 and may perform control operation according to the received information. More specifically, when antenna tuning information is received from the pattern identifier 163, the antenna control part 165 may forward the antenna tuning information to the antenna bandwidth adjuster 164. The antenna bandwidth adjuster 164 delivers circuit adjustment values corresponding to the antenna tuning information to the antenna controller 220, so that circuit elements of the antenna controller 220 are set to have adjusted values. Accordingly, the antenna bandwidth adjuster 164 may compensate for a change in the resonance frequency response of the antenna 210 caused by the grip of the user. When power control information is received from the pattern identifier 163, the antenna control part 165 may forward the power control information to the antenna power adjuster 166. The antenna power adjuster 166 may decrease or increase the supply of power to the antenna 210 or the communication unit 110 according to the received power control information.

As described above, the mobile terminal supporting the control method of the present invention may perform a power decrement operation for SAR reduction or perform a performance enhancement operation for the antenna according to a sensed grip pattern of the user. Hence, the user may utilize the mobile terminal under safer conditions and with improved communication performance.

Hereinabove, individual components of the mobile terminal and their functions have been described in detail. Next, a description is given of a method for controlling the mobile terminal.

Figure 4:
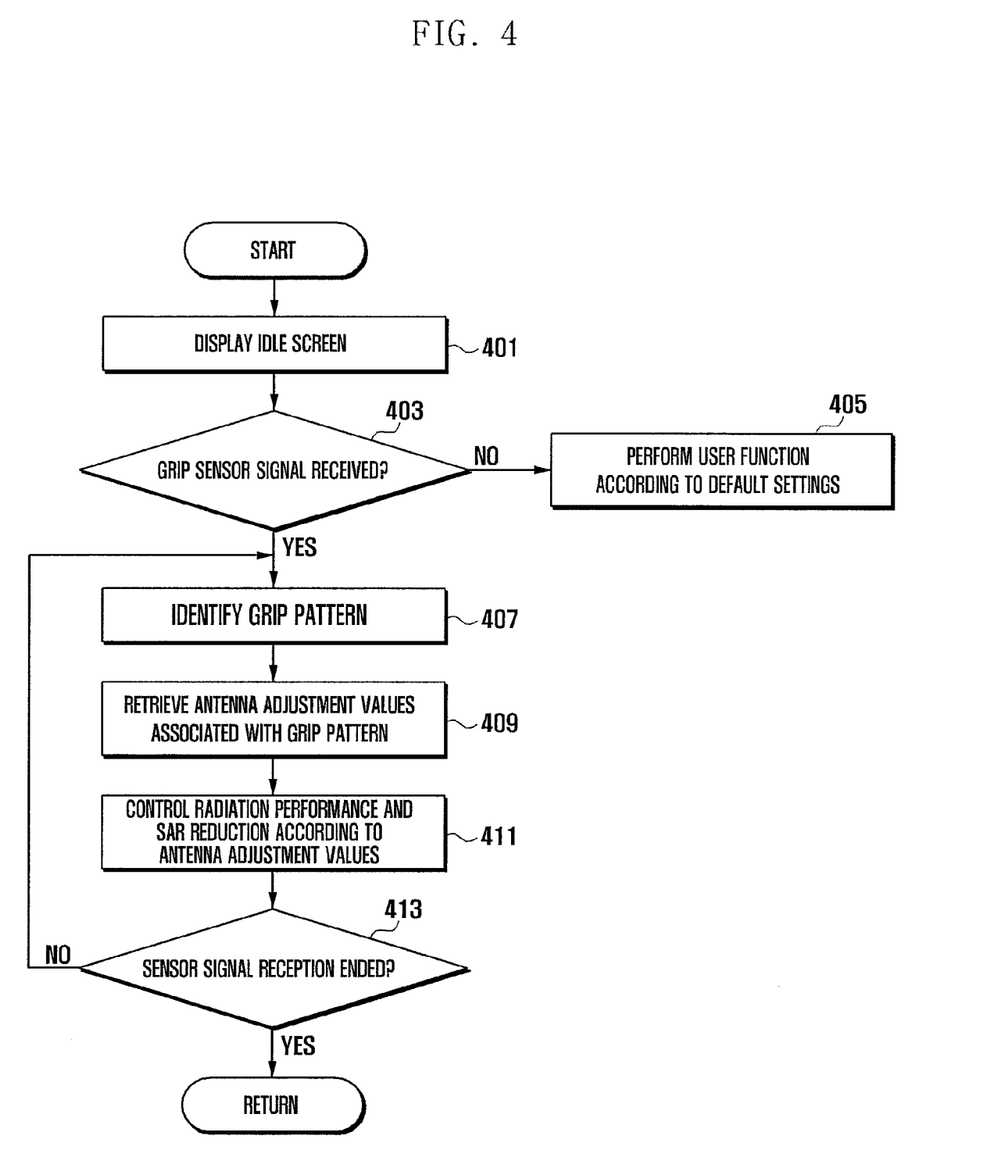
FIG. 4 is a flowchart of a method for controlling the mobile terminal of FIGS. 1-2 in consideration of a communication environment according to an exemplary embodiment of the present invention.

FIG. 4 is a flowchart of a method for controlling the mobile terminal 100 in consideration of a communication environment according to another exemplary embodiment of the present invention.

Referring to FIG. 4, in the terminal control method, when the mobile terminal 100 is turned on, the control unit 160 initializes individual components of the mobile terminal 100 and displays an idle screen on the display unit 140 at step 401.

The control unit 160 checks whether a grip sensor signal is received at step 403. Here, the control unit 160 may supply power to the grip sensor unit 170 and monitor the generation of a sensing signal from the grip sensor unit 170. At step 401, before checking for reception of the grip sensor signal, the display of the idle screen may be replaced with a different operation such as a playback of an audio file or entering into a sleep mode for power saving.

When a grip sensor signal is not received, the control unit 160 may control the antenna module 200 according to default settings and perform a requested user function at step 405. For example, the control unit 160 may control the communication means including the communication unit 110 and the antenna module 200 not to perform a separate power decrement, transmit power output decrement, or antenna tuning operation. The control unit 160 may perform a user function such as file playback in response to an input signal from the input unit 120 or from the display unit 140 having a touchscreen capability.

When a grip sensor signal is received from the grip sensor unit 170, the control unit 160 identifies a grip pattern on the basis of the received grip sensor signal at step 407. To achieve this, the grip sensor unit 170 may include multiple grip sensors installed at sides of the case of the mobile terminal 100, or other sensors capable of sensing the form of the user's grip. For example, grip sensors may be installed at one or more of the left side, the right side, an upper portion of a side, a lower portion of a side, and the back side. If necessary, another grip sensor may be installed at an edge region of the front side, on which the display unit 140 is arranged. Arrangement of grip sensors may be determined according to design. Generally, as more grip sensors are installed at locations on the case, the operation of the pattern identifier will become more accurate. The control unit 160 identifies a current grip pattern on the basis of location indications and sensed values carried by sensing signals from the grip sensor unit 170. The control unit 160 may find a reference grip pattern matching the identified grip pattern from the control table 151 stored in the storage unit 150.

Here, a matching reference grip pattern may be found using a similarity measure with a given margin of error. Alternatively, among the stored reference grip patterns, a reference grip pattern that is most similar to the identified grip pattern may be found as a matching reference grip pattern. At step 407, the control unit 160 may activate a timer immediately after identification of a grip pattern. When the identified grip pattern does not change before an expiration of the timer, the control unit 160 may then treat the identified grip pattern as valid and proceed to find the matching reference grip pattern. When the identified grip pattern changes before expiration of the timer, the control unit 160 may treat the identified grip pattern as transient and therefore invalid, and restart the timer to identify a new grip pattern from sensing signals. Hence, in matching for a reference grip pattern, it is possible to prevent a waste of power and unnecessary computation caused by frequent changes in the form of the user's grip.

Thereafter, the control unit 160 retrieves an antenna adjustment value, including at least one of an antenna tuning value and a power control value, associated with the found reference grip pattern from the control table 151 at step 409. The control unit 160 controls radiation performance and SAR reduction according to the antenna adjustment value at step 411. That is, the control unit 160 controls an operation to tune the antenna module 200 for radiation performance enhancement, and to decrease at least one of the supply of power to the communication means and the transmit power output of the communication means by a preset magnitude for SAR reduction. Here, as the magnitude of power decrement may vary depending upon the terminal size and the communication chips, the corresponding power control value may be determined empirically. As the antenna tuning value may also vary depending upon grip patterns of the user and terminal sizes and models, it is preferable to derive the antenna tuning value empirically for each terminal model.

The control unit 160 determines whether sensor signal reception is ended at step 413. When sensor signal reception is not ended, the control unit 160 returns to step 407 and continues processing for antenna performance enhancement and SAR reduction. When sensor signal reception is ended, the control unit 160 may return to step 401 to continue the process.

As described above, the mobile terminal 100 of the present invention may perform control operations in consideration of conditions of a user's grip on the mobile terminal 100. For example, the user may grip the mobile terminal 100 to use either communication functions or non-communication functions. More specifically, to compose and send a message, the user may grip the left and right sides of the mobile terminal 100 with both hands or grip one side or two sides (for example, the left and right sides) thereof with one hand. Here, when the grip sensor unit 170 includes multiple grip sensors that are installed at the left side, right side, and back side of the mobile terminal 100, the control unit 160 may identify a pattern of grip with both hands or a pattern of grip on one side with one hand. On the basis of the identified grip pattern, during message composition, the control unit 160 may control an operation not to perform particular power decrement for SAR reduction. For message transmission, the designer may empirically determine the amount of degradation in antenna radiation performance caused by the above grip pattern and generate antenna tuning information to compensate for the radiation performance degradation. For example, the designer may pre-store antenna tuning information in the control table 151 so as to compensate for a change in communication frequency response due to a grip with both hands. Thereby, the mobile terminal 100 may perform normal message transmission under particular grip conditions.

Similarly, to browse webpages on the Internet, the user may grip sides of the mobile terminal 100 with both hands or may grip one side thereof with one hand, depending upon the size or model of the mobile terminal 100. When the mobile terminal 100 supports portrait view mode and landscape view mode, the user may grip sides of the mobile terminal 100 with both hands or grip one side thereof with one hand. Here, a portion of the back side may contact the hand. Similarly to the case of message composition, the control unit 160 may control an operation to perform antenna performance tuning according to a grip with both hands and not to perform power decrement for SAR reduction. For Web browsing or message composition, as the mobile terminal 100 is separated by a given distance from the body of the user, the control unit 160 may control an operation not to perform the SAR reduction function and to normally supply power for good communication performance.

During communication in a voice call, as the mobile terminal 100 is placed close to the head of the user, it is necessary to perform at least one of supply power decrement and transmit power output decrement for SAR reduction Hence, when an identified grip pattern indicates communication using a voice call, the control unit 160 may control an operation to perform at least one of supply power decrement and transmit power output decrement for SAR reduction. While the user is engaged in a voice call, the user grips sides of the mobile terminal 100 with one hand (for example, the thumb or one finger contacts a first side (e.g. the left side of the case of the mobile terminal) and other fingers contact a second side (e.g. the right side of the case of the mobile terminal)). In this case, the control unit 160 may identify a grip pattern related to a voice call on the basis of sensing signals from multiple grip sensors installed at sides of the mobile terminal 100, and control an operation to perform at least one of supply power decrement and transmit power output decrement for SAR reduction and to perform antenna tuning for radiation performance enhancement as to a grip with one hand.

During communication in a video call, unlike the case of a voice call, the user grips the mobile terminal 100 with both hands or grip the mobile terminal 100 with one hand while the palm contacts the back side thereof (for example, fingers or the hand contacts the left and right sides and the back side of the case). Hence, for a grip with both hands, the control unit 160 may control the communication means as in the case of message composition or web browsing; and for a grip with one hand, the control unit 160 may control the communication means according to presence of contact with the palm.

In the above description, at least one of antenna tuning and transmit power output decrement is performed according to arrangement of four grip sensors and grip of particular grip sensors. However, the present invention is not limited thereto. For example, the mobile terminal 100 may have more grip sensors and include a large number of predefined grip patterns (for example, dozens of grip patterns) according to sensing signals from the grip sensors. A user grip pattern indicated by sensing signals from the grip sensor unit is identified through comparison with the predefined grip patterns, and the mobile terminal 100 may perform at least one of antenna tuning and power decrement according to the identified grip pattern. To achieve this, for each predefined grip pattern, antenna tuning values, power decrement values, and combinations of antenna tuning values and power decrement values may be empirically obtained in consideration of manufacturing characteristics and frequency characteristics of the mobile terminal 100, and information on mappings between the predefined grip patterns and these values may be pre-stored in the mobile terminal 100.

Figure 5:
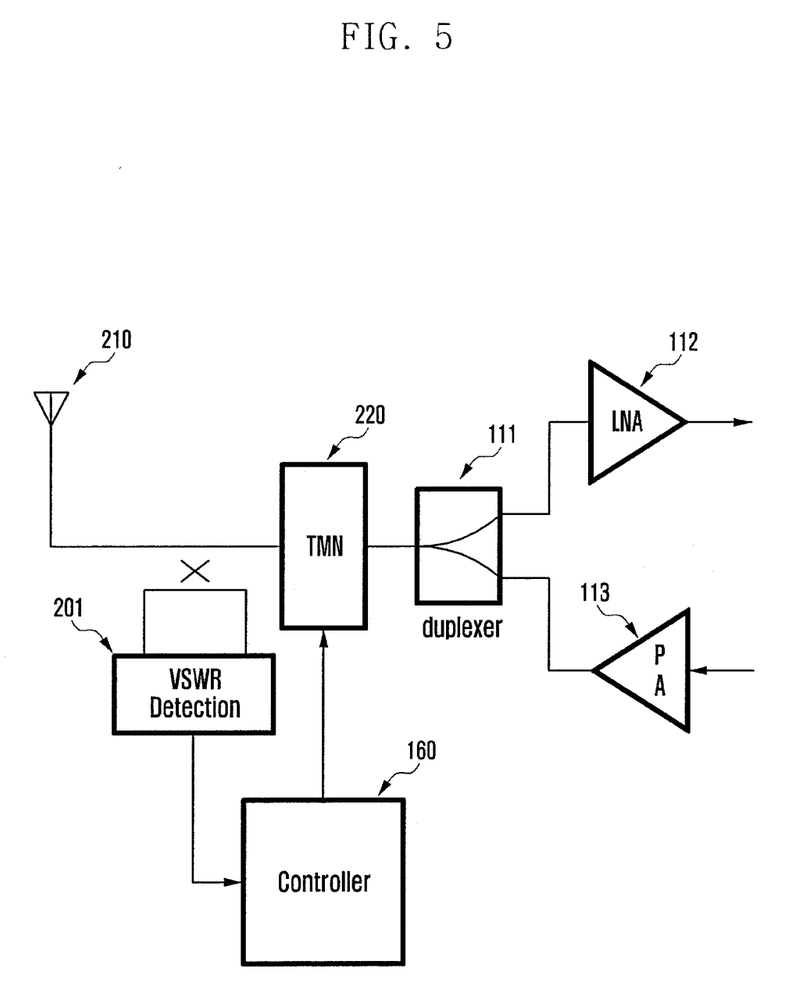
FIG. 5 illustrates an antenna related structure in the mobile terminal according to an exemplary embodiment of the present invention.

FIG. 5 illustrates an antenna related structure in the mobile terminal according to an exemplary embodiment of the present invention.

Referring to FIG. 5, the mobile terminal 100 may include an antenna 210, a TMN 221, a duplexer 111, a Low Noise Amplifier (LNA) 112, a Power Amplifier (PA) 113, a Voltage Standing Wave Ratio (VSWR) detector 201, and a control unit 160. The TMN 221 may correspond to the antenna controller 220 described earlier. The duplexer 111, LNA 112, and PA 113 may correspond to the communication unit 110.

In the mobile terminal 100 having the above configuration, when a signal flowing on the antenna 210 is detected by the VSWR detector 201 and is forwarded to the control unit 160, the control unit 160 may control the TMN 221 according to the forwarded signal. The TMN 221 is an element for supporting frequency tuning of the antenna 210, and may adjust characteristics of the antenna 210 under control of the control unit 160. The duplexer 111 separates a transmit signal from a receive signal during signal transmission and reception, the LNA 112 is a low-noise amplifier, and the PA 113 is a power amplifier.

As described above, in the mobile terminal 100, the control unit 160 may adjust characteristics of the antenna 210 according to detection results of the VSWR detector 201 so as to accomplish SAR reduction. In particular, for optimal SAR reduction, the control unit 160 may perform various antenna tuning by controlling the TMN 221 according to types of grip on the mobile terminal 100. For SAR reduction through power decrement, the control unit 160 may perform power control according to types of grip on the mobile terminal 100. Here, the VSWR detector 201 may provide the control unit 160 with an indication to a radiation pattern corresponding to the type of user grip on the mobile terminal 100. To identify a radiation pattern indicated by the VSWR detector 201, the control unit 160 may use pre-stored information on mappings between radiation patterns and grip conditions. To achieve this, the mobile terminal 100 may further include a storage unit to pre-store information on mappings between various patterns and transmit power output values and antenna tuning values for the communication means.

For example, as described below, 'A' to 'O' types of grip (or grip patterns) may be predefined and antenna tuning values may be associated with the grip types, so that at least one of antenna frequency tuning and antenna transmit power tuning can be conducted according to the type of user grip on the mobile terminal 100. To be more specific, states or conditions of user grip on the mobile terminal 100 may be classified into 'A' to 'O' grip types, and frequency tuning values for the TMN 221 may be assigned to each grip type. That is, values assigned to "A" to "O" grip types may be values for tuning the TMN 221 so that radiation characteristics of the antenna may be optimized according to types of user grip. These tuning values may be varied according to frequency bands, and may be empirically obtained according to frequency bands used by the mobile terminal 100.

Next, a description is given of grip types or patterns corresponding to changes in antenna radiation patterns. That is, values described below may be applied on a grip pattern basis.

Fifteen ('A' to 'O') grip types are exemplarily defined according to states of four grip sensors, and parameter values for frequency tuning of the TMN 221 are given for each type as shown in Table 1.

TABLE 1

| Type | Shunt | Series | Shunt |
| --- | --- | --- | --- |
| A | 1 pF | 1.8 nH | 18 nH |
| B | 1.5 pF | 1.8 nH | 18 nH |
| C | 2.0 pF | 1.8 nH | 18 nH |
| D | 2.5 pF | 1.8 nH | 18 nH |
| E | 3.0 pF | 1.8 nH | 18 nH |
| F | 3.5 pF | 1.8 nH | 18 nH |
| G | 4.0 pF | 1.8 nH | 18 nH |
| H | 4.5 pF | 1.8 nH | 18 nH |
| I | 5.0 pF | 1.8 nH | 18 nH |
| J | 5.5 pF | 1.8 nH | 18 nH |
| K | 6.0 pF | 1.8 nH | 18 nH |
| L | 6.5 pF | 1.8 nH | 18 nH |
| M | 7.0 pF | 1.8 nH | 18 nH |
| N | 7.5 pF | 1.8 nH | 18 nH |
| O | 8.0 pF | 1.8 nH | 18 nH |

Values of circuit elements for 'A' to 'O' grip types in Table 1 are illustrative only, and may be varied according to terminal designs and used frequency bands. The number of grip types may be increased or decreased according to the number of used grip sensors or to used sensing schemes.

In Table 1, with reference to first to fourth grip sensors (Touch 1, Touch 2, Touch 3, and Touch 4) shown in FIG. 1, antenna tuning values for type 'A' may correspond to a case where the first grip sensor (Touch 1) is gripped at a given pressure level or above, and the remaining grip sensors are partially gripped at a given pressure level or below or are not gripped. Values for type 'B' may correspond to a case where the second grip sensor (Touch 2) is gripped; values for type 'C' may correspond to a case where the third grip sensor (Touch 3) is gripped; and values for type 'D' may correspond to a case where the fourth grip sensor (Touch 4) is gripped.

Antenna tuning values for type 'E' may correspond to a case where the first and second grip sensors (Touch 1 and Touch 2) are gripped at a given level or above and the remaining grip sensors are partially gripped at a given level or below or are not gripped. Values for type 'F' may correspond to a case where the first and third grip sensors (Touch 1 and Touch 3) are gripped; values for type 'G' may correspond to a case where the first and fourth grip sensors (Touch 1 and Touch 4) are gripped; values for type 'H' may correspond to a case where the second and third grip sensors (Touch 2 and Touch 3) are gripped; values for type 'I' may correspond to a case where the second and fourth grip sensors (Touch 2 and Touch 4) are gripped; and values for type 'J' may correspond to a case where the third and fourth grip sensors (Touch 3 and Touch 4) are gripped.

Antenna tuning values for type 'K' may correspond to a case where the first to third grip sensors (Touch 1, Touch 2, and Touch 3) are gripped at a given level or above and the fourth grip sensor (Touch 4) is partially gripped at a given level or below or is not gripped. Values for type 'L' may correspond to a case where the first, second, and fourth grip sensors (Touch 1, Touch 2, and Touch 4) are gripped; values for type 'M' may correspond to a case where the first, third, and fourth grip sensors (Touch 1, Touch 3, and Touch 4) are gripped; and values for type 'N' may correspond to a case where the second, third, and fourth grip sensors (Touch 2, Touch 3, and Touch 4) are gripped.

Antenna tuning values for type 'O' may correspond to a case where the first to fourth grip sensors (Touch 1 to Touch 4) are gripped.

In addition, for SAR reduction, the mobile terminal 100 may adjust transmit power output according to grip states. For example, the mobile terminal 100 may adjust transmit power output according to one of fifteen ('a' to 'o') grip types. Here, the fifteen grip types correspond to grip states when four grip sensors are arranged. For SAR reduction, the mobile terminal 100 may output different transmit powers for different grip types.

Adjustment of transmit power output for each grip type is exemplarily described with reference to a specific product GSM850, as illustrated in Tables 2 to 16.

TABLE 2

| Type 'a' | |
|---|---|
| GSM850 | Magnitude of transmit power output |
| tx2g[0] | 0 |
| tx2g[1] | 72 |
| tx2g[2] | 120 |
| tx2g[3] | 152 |
| tx2g[4] | 164 |
| tx2g[5] | 112 |

TABLE 3

| Type 'b' | |
|---|---|
| GSM850 | Magnitude of transmit power output |
| tx2g[0] | 0 |
| tx2g[1] | 76 |
| tx2g[2] | 124 |
| tx2g[3] | 156 |
| tx2g[4] | 168 |
| tx2g[5] | 112 |

TABLE 4

| Type 'c' | |
|---|---|
| GSM850 | Magnitude of transmit power output |
| tx2g[0] | 0 |
| tx2g[1] | 80 |
| tx2g[2] | 128 |
| tx2g[3] | 160 |
| tx2g[4] | 172 |
| tx2g[5] | 112 |

TABLE 5

| Type 'd' | |
|---|---|
| GSM850 | Magnitude of transmit power output |
| tx2g[0] | 0 |
| tx2g[1] | 84 |
| tx2g[2] | 132 |
| tx2g[3] | 164 |
| tx2g[4] | 176 |
| tx2g[5] | 112 |

TABLE 6

| Type 'e' | |
|---|---|
| GSM850 | Magnitude of transmit power output |
| tx2g[0] | 0 |
| tx2g[1] | 88 |
| tx2g[2] | 136 |
| tx2g[3] | 168 |
| tx2g[4] | 180 |
| tx2g[5] | 112 |

TABLE 7

| Type 'f' | |
|---|---|
| GSM850 | Magnitude of transmit power output |
| tx2g[0] | 0 |
| tx2g[1] | 92 |
| tx2g[2] | 140 |
| tx2g[3] | 172 |
| tx2g[4] | 184 |
| tx2g[5] | 112 |

TABLE 8

| Type 'g' | |
|---|---|
| GSM850 | Magnitude of transmit power output |
| tx2g[0] | 0 |
| tx2g[1] | 96 |
| tx2g[2] | 144 |
| tx2g[3] | 176 |
| tx2g[4] | 188 |
| tx2g[5] | 112 |

TABLE 9

| Type 'h' | |
|---|---|
| GSM850 | Magnitude of transmit power output |
| tx2g[0] | 0 |
| tx2g[1] | 100 |
| tx2g[2] | 148 |
| tx2g[3] | 180 |
| tx2g[4] | 192 |
| tx2g[5] | 112 |

TABLE 10

| Type 'i' | |
|---|---|
| GSM850 | Magnitude of transmit power output |
| tx2g[0] | 0 |
| tx2g[1] | 104 |
| tx2g[2] | 152 |
| tx2g[3] | 184 |
| tx2g[4] | 196 |
| tx2g[5] | 112 |

TABLE 11

| Type 'j' | |
|---|---|
| GSM850 | Magnitude of transmit power output |
| tx2g[0] | 0 |
| tx2g[1] | 108 |
| tx2g[2] | 156 |
| tx2g[3] | 188 |
| tx2g[4] | 200 |
| tx2g[5] | 112 |

TABLE 12

| Type 'k' | |
|---|---|
| GSM850 | Magnitude of transmit power output |
| tx2g[0] | 0 |
| tx2g[1] | 112 |
| tx2g[2] | 160 |
| tx2g[3] | 192 |
| tx2g[4] | 204 |
| tx2g[5] | 112 |

TABLE 13

| Type 'l' | |
|---|---|
| GSM850 | Magnitude of transmit power output |
| tx2g[0] | 0 |
| tx2g[1] | 116 |
| tx2g[2] | 164 |
| tx2g[3] | 196 |
| tx2g[4] | 208 |
| tx2g[5] | 112 |

TABLE 14

| Type 'm' | |
|---|---|
| GSM850 | Magnitude of transmit power output |
| tx2g[0] | 0 |
| tx2g[1] | 120 |
| tx2g[2] | 168 |
| tx2g[3] | 200 |
| tx2g[4] | 212 |
| tx2g[5] | 112 |

TABLE 15

| Type 'n' | |
|---|---|
| GSM850 | Magnitude of transmit power output |
| tx2g[0] | 0 |
| tx2g[1] | 124 |
| tx2g[2] | 172 |
| tx2g[3] | 204 |
| tx2g[4] | 216 |
| tx2g[5] | 112 |

TABLE 16

| Type 'o' | |
|---|---|
| GSM850 | Magnitude of transmit power output |
| tx2g[0] | 0 |
| tx2g[1] | 128 |
| tx2g[2] | 176 |
| tx2g[3] | 208 |
| tx2g[4] | 220 |
| tx2g[5] | 112 |

As described above, in the mobile terminal 100, the transmit power output may be varied for different grip patterns. Transmit power output values in Tables 2 to 16 are exemplary parameter values for the transmit power output of the transmitter and the actual transmit power of the transmitter may be changed according to the default output of the transmitter when specific values are applied.

In Tables 2 to 16, tx2g[0] to tx2g[5] indicate registers arranged in the transmitter, and four registers are used to adjust the transmit power output. Here, tx2g[5] may indicate a reserved register, in which a fixed or dummy value may be written.

In the above description, the present invention is applied to a particular product GSM850. The present invention may also be applied to various products such as EDGE850, WCDMA 850, GSM1900, EDGE1900, and WCDMA1900. For example, as in the case of GSM850, an adjustment of transmit power output for a specific type may be applied to other products as illustrated in Tables below.

TABLE 17

| EDGE850 | Magnitude of transmit power output |
|---|---|
| tx2g[0] | 0 |
| tx2g[1] | 96 |
| tx2g[2] | 112 |
| tx2g[3] | 128 |
| tx2g[4] | 144 |
| tx2g[5] | 112 |

TABLE 18

| GSM1900 | Magnitude of transmit power output |
|---|---|
| tx2g[0] | 0 |
| tx2g[1] | 64 |
| tx2g[2] | 144 |
| tx2g[3] | 160 |
| tx2g[4] | 184 |
| tx2g[5] | 112 |

TABLE 19

| EDGE1900 | Magnitude of transmit power output |
|---|---|
| tx2g[0] | 0 |
| tx2g[1] | 68 |
| tx2g[2] | 84 |
| tx2g[3] | 116 |
| tx2g[4] | 132 |
| tx2g[5] | 96 |

In the above exemplary description, the maximum power value of a grip sensor in GSM1900 and EDGE1900 may be set to 248, and the maximum power value of a grip sensor in GSM850 and EDGE850 may be set to 264.

As described above, for SAR reduction, the transmit power output may be adjusted differently according to types of products and communication characteristics thereof As in the case of GSM850, the transmit power output of other products may be adjusted according to grip patterns.

States of grip sensors and grip types for antenna tuning and transmit power output adjustment are summarized in Table 20.

TABLE 20

| | A/a | B/b | C/c | D/d | E/e | F/f | G/g | H/h | I/i | J/j | K/k | L/l | M/m | N/n | O/o |
|---|---|---|---|---|---|---|---|---|---|---|---|---|---|---|---|
| touch1 | O | | | O | O | O | | | | | O | O | O | | O |
| touch2 | | O | | O | | | O | O | | | O | O | | O | O |
| touch3 | | | O | | O | | O | O | | O | O | | | O | O |
| touch4 | | | | O | | O | | O | O | | | O | O | O | O |

In Table 20, rows indicate grip sensors and columns indicate types of grip.

By performing at least one of antenna tuning and power control as described above, SAR reduction may be achieved as illustrated in Table 21.

TABLE 21

| BAND | GSM850 | GSM1900 | WCDMA850 | WCDMA1900 |
|---|---|---|---|---|
| Before application | 1.97 W/kg | 3.39 W/kg | 1.65 W/kg | 3.72 W/kg |
| After application | 0.912 W/kg | 1.15 W/kg | 0.407 W/kg | 1.18 W/kg |

In the above description, antenna tuning and transmit power output are performed in fifteen steps as indicated by 'A' to 'O' types or 'a' to 'o' types. However, the present invention is not limited thereto, and more types (for example, 20 or more) may be defined. That is, in the mobile terminal 100, multiple types of grip may be predefined, and at least one of antenna tuning and transmit power adjustment may be performed optimally according to a sensed grip pattern, achieving SAR reduction.

In other words, for optimal SAR reduction, the control unit 160 may perform at least one of antenna tuning and transmit power adjustment according to the type of user grip on the mobile terminal 100. To achieve this, antenna tuning values and transmit power adjustment values may be predefined for each grip type or grip pattern. As described before, antenna tuning values and transmit power adjustment values may be different according to products and manufacturing or communication characteristics thereof If necessary, the mobile terminal 100 may further include various components. That is, although not shown, the mobile terminal 100 may further include at least one of a short-range communication module for short-range communication, a camera module for capturing still or moving images of a target object, a data communication interface based on wired and wireless communication, an Internet communication module for Internet access, and a digital broadcast receiving module for playing back digital broadcasts. With the digital convergence trend, it should be apparent to those skilled in the art that the mobile terminal 100 of the present invention may further include a unit comparable to the above-described units, and one unit of the mobile terminal 100 may be removed or replaced with another unit.

The mobile terminal 100 of the present invention may be a device having grip sensors and an antenna tuning module, and may be any information and communication appliance or multimedia appliance, such as a mobile communication terminal based on communication protocols supporting various communication systems, a portable multimedia player (PMP), a digital broadcast receiver, a personal digital assistant (PDA), a music player like an MP3 player, a portable game console, a smart phone, a notebook computer, or a handheld computer.

In a feature of the present invention, the mobile terminal supporting the control method can perform power control for SAR reduction according to the grip condition and ensure a suitable level of communication performance through antenna tuning. Hence, the user may utilize the mobile terminal under safer conditions.

Although exemplary embodiments of the present invention have been described in detail hereinabove, it should be understood that many variations and modifications of the basic inventive concept described herein will still fall within the spirit and scope of the present invention as defined in the appended claims.

What is claimed is:

1. An apparatus comprising:
   at least one proximity sensor; and
   one or more processors operatively coupled with the at least one proximity sensor, the one or more processors configured to:
      identify, via the at least one proximity sensor, a distance between an object external to the apparatus and at least one portion of the apparatus;
      identify an elapsed time based at least in part on a determination that the distance falls within a specified range; and
      determine, based at least in part on a determination that the distance falls within a specified range and the elapsed time falls within a specified period of time, a transmission power according to specified data such that a specific absorption rate (SAR) can be adjusted.

2. The apparatus of claim 1, wherein the one or more processors are configured to:
   reduce, via a communication circuitry operatively coupled with the one or more processors, the transmission power based at least in part on the determination that the distance falls into a specified range.

3. The apparatus of claim 2, wherein the one or more processors are configured to:
   increase, via the communication circuitry, the transmission power according to another specified data such that the transmission power can be changed to another power level, based at least in part on a determination that the distance falls into another specified range.

4. The apparatus of claim 1, wherein the one or more processors are configured to:
   provide, via an output device operatively coupled with the one or more processors, a notification associated with the determining to a user, the output device including at least one of a display or a speaker.

5. The apparatus of claim 1, wherein the one or more processors are configured to:
  adjust, via a communication circuitry operatively coupled with the one or more processors, a resonance frequency according to another specified data to control the communication circuitry.

6. The apparatus of claim 1, wherein the specified data comprises a control table to adjust the transmission power of a communication circuitry operatively coupled with the one or more processors.

7. The apparatus of claim 1, wherein the specified data comprises at least one of amplitude of a signal corresponding to the distance, power control information related to the transmission power, or circuitry control information related to a communication circuitry operatively coupled with the one or more processors.

8. The apparatus of claim 1, wherein the at least one proximity sensor comprises at least one grip sensor.

9. The apparatus of claim 1, wherein the at least one proximity sensor is formed in an interior of the apparatus.

10. The apparatus of claim 1, wherein the object comprises at least one portion of a human body.

11. The apparatus of claim 1, further comprising a communication circuitry operatively coupled with the one or more processors, the communication circuitry including at least one of an antenna, a power amplifier, or a circuit element.

12. The apparatus of claim 1, wherein the one or more processors comprises at least one of a control unit, an antenna controller, or a display controller.

13. A method comprising:
  identifying, via at least one proximity sensor, a distance between an object external to an electronic device and at least one portion of the electronic device;
  identify an elapsed time based at least in part on a determination that the distance falls within a specified range; and
  determining, based at least in part on a determination that the distance falls into a specified range and the elapsed time falls within a specified period of time, a transmission power according to specified data such that a radiation characteristic associated with the electronic device can be adjusted.

14. The method of claim 13, further comprising:
  reducing, via a communication circuitry, the transmission power based at least in part on the determination that the distance falls into a specified range.

15. The method of claim 14, further comprising:
  automatically increasing, via the communication circuitry, the transmission power according to another specified data to change the transmission power to another power level based at least in part on a determination that the distance falls into another specified range.

16. The method of claim 13, further comprising:
  adjusting, via a communication circuitry, a resonance frequency according to control information related to the communication circuitry.

17. The method of claim 13, wherein the specified function comprises at least one of a voice call function, a video call function, an internet function or a message function.

18. The method of claim 13, wherein the determining comprises:
  determining another transmission power corresponding to the function.

19. The method of claim 13, wherein the identifying comprises:
  identifying a duration in which the distance stays in the specified range.

20. The method of claim 19, wherein the determining comprises:
  determining the transmission power based at least in part on a determination that the duration falls into a specified duration range.

21. The method of claim 19, wherein the identifying of the duration comprises:
  refraining from determining the transmission power based at least in part on a determination that the duration falls into another specified duration range.

22. The method of claim 13, wherein the radiation characteristic comprises a specific absorption rate (SAR).

23. A non-transitory computer-readable storage medium storing instructions that, when executed by one or more processors, cause the one or more processors to perform operations comprising:
  identifying, via at least one proximity sensor, a distance between an object external to an electronic device and at least one portion of the electronic device;
  identify an elapsed time based at least in part on a determination that the distance falls within a specified range; and
  determining, based at least in part on a determination that the distance falls into a specified range and the elapsed time falls within a specified period of time, a transmission power according to specified data such that a radiation characteristic associated with the electronic device can be adjusted.

* * * * *